United States Patent [19]

Seki et al.

[11] 4,341,438

[45] Jul. 27, 1982

[54] LIGHT SOURCE ARRANGEMENT IN AN OPTICAL COMMUNICATION SYSTEM

[75] Inventors: Norio Seki, Tokyo; Yohtaro Yatsuzuka, Yokohama; Haruo Sakaguchi, Tokyo, all of Japan

[73] Assignee: Kokusai Denshin Denwa Co., Ltd., Tokyo, Japan

[21] Appl. No.: 153,968

[22] Filed: May 28, 1980

[30] Foreign Application Priority Data

Jun. 6, 1979 [JP] Japan ................... 54-69968

[51] Int. Cl.³ .................... G02B 5/172; H04B 9/00
[52] U.S. Cl. ........................ 350/96.16; 350/96.18; 370/3; 455/612
[58] Field of Search ............. 350/96.15, 96.16, 96.17, 350/96.18, 96.19; 370/1, 3; 455/600, 601, 610, 612

[56] References Cited

U.S. PATENT DOCUMENTS

| | | | |
|---|---|---|---|
| 3,825,335 | 7/1974 | Reynolds | 350/96.16 X |
| 4,111,524 | 9/1978 | Tomlinson | 350/96.19 |
| 4,244,045 | 1/1981 | Nosu et al. | 370/3 |

FOREIGN PATENT DOCUMENTS 55-29886 3/1980 Japan ................ 350/96.16
55-37023 3/1980 Japan .

OTHER PUBLICATIONS

"An Internal Reflection Film Type Micro-Optic Circuit", article S3-13, 1978, Gen Mtg. of IOE&C of Japan, pp. 4-244 to 4-256.

Primary Examiner—John D. Lee
Attorney, Agent, or Firm—Ratner & Prestia

[57] ABSTRACT

The operational reliability of a light source in an optical communication system has been increased by an improved redundant arrangement of light sources and the switching arrangement of the same. The present light source arrangement comprises a plurality of light sources each of which provides a different wavelength from one another, an electrical switch for actuating the selected one of the light sources, said electrical switch being arranged to replace the actuated light source when there is something wrong with the light source in operation, and an optical multiplexer the input of which is coupled to the outputs of the light sources, and the output of the optical multiplexer is connected to an optical fiber cable.

1 Claim, 5 Drawing Figures

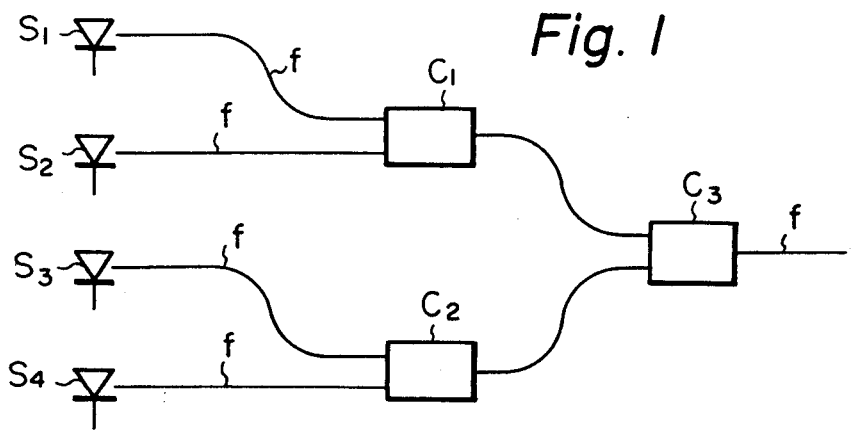
Fig. 1
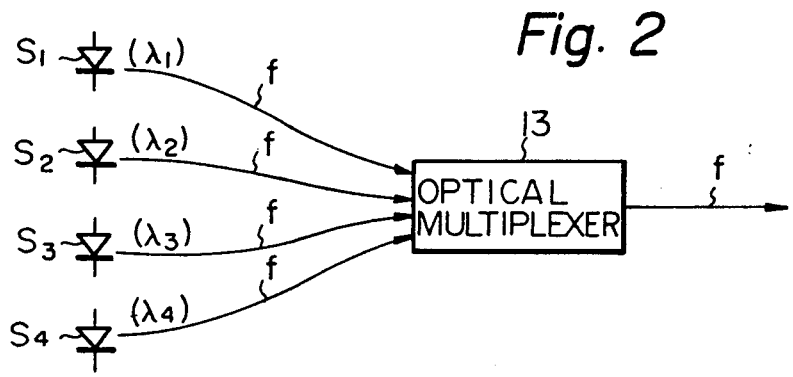
Fig. 2
Fig. 3
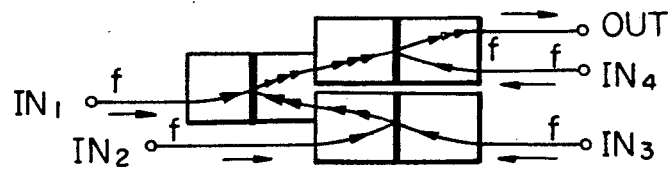

LIGHT SOURCE ARRANGEMENT IN AN OPTICAL COMMUNICATION SYSTEM

BACKGROUND OF THE INVENTION

The present invention relates to an optical light source arrangement and, in particular, relates to such a system having a redundant arrangement for the use of an optical communication system.

In an optical communication system using an optical fiber cable for a long line communication system, like an intercontinental communication line, the operational reliability of the system must be extremely high compared with that of a short communication line, since it takes a long time and much cost for repairing the fault when there is something wrong with the communication system.

In an optical communication system using an optical fiber cable and a plurality of optical repeaters, the most important element for improving the operational reliability of the system is an optical light source installed in each optical repeater for converting a repeated and/or amplified electrical signal to an optical signal which is to be transmitted to an optical fiber cable, since the operational reliability of that light source is relatively low compared with that of electrical components installed in an optical repeater.

Therefore, a redundant arrangement of an optical light source has been proposed for improving the operational reliability of an optical repeater.

FIG. 1 is the prior light source redundant arrangement, which is shown in the Japanese patent laid open publication No. 37023/80, in which $S_1$, $S_2$, $S_3$ and $S_4$ are light sources which provide the same wavelength of optical energy as one another, $C_1$, $C_2$ and $C_3$ are optical couplers each of which is implemented by a rod lens or a simple connection of optical fibers. Each optical light source $S_1$ through $S_4$ is implemented by a light emitting diode (LED) or a laser diode, which is energized by an electrical circuit including an automatic power control (APC), a bias circuit, and a driving circuit (not shown). The symbol (f) shows an optical fiber.

One of the light sources $S_1$ through $S_4$ is selectively actuated, and when the light source is degraded, the operational light source is switched to another one.

However, the light source arrangement in FIG. 1 has the disadvantage that the insertion loss of an optical coupler is rather high. Generally, each optical coupler $C_1$ through $C_3$ has the insertion loss of approximate 3 dB, and since a pair of optical couplers $C_1$ and $C_3$, or $C_2$ and $C_3$ are inserted in series, the total insertion loss is 6 dB. That large insertion loss by optical couplers shortens the spacing between repeaters, and even when many light sources and many optical couplers are utilized, the operational reliability of the total communication system is not significantly improved.

SUMMARY OF THE INVENTION

It is an object of the present invention to overcome the disadvantages and limitations of a prior light source arrangement by providing a new and improved light source arrangement.

It is also an object of the present invention to provide a light source arrangement which allows the low insertion loss and the high operational reliability with the redundant arrangement.

The above and other objects are attained by a light source arrangement comprising a plurality of pairs of light sources, each light source within each pair having identical wavelengths and each pair having a different wavelength from each other pair. A plurality of optical couplers are provided each connected to one of the pairs of light sources for coupling together the outputs of each light source pair. An optical multiplexer is connected between each of the optical couplers and an optical fiber cable for multiplexing the outputs of each of the optical couplers to the optical fiber cable. An electrical switch selectively actuates one of the light sources wherein the switch is arranged to select one of the light sources when another of the light sources has failed.

BRIEF DESCRIPTION OF THE DRAWINGS

The foregoing and other objects, features, and attendant advantages of the present invention will be appreciated as the same become better understood by means of the following description and accompanying drawings wherein;

FIG. 1 is the prior light source redundant arrangement in a communication system, FIG. 2 is the embodiment of the light source redundant arrangement according to the present invention, FIG. 3 is the embodiment of the optical multiplexer.

DESCRIPTION OF THE PREFERRED EMBODIMENTS

Figure 4:
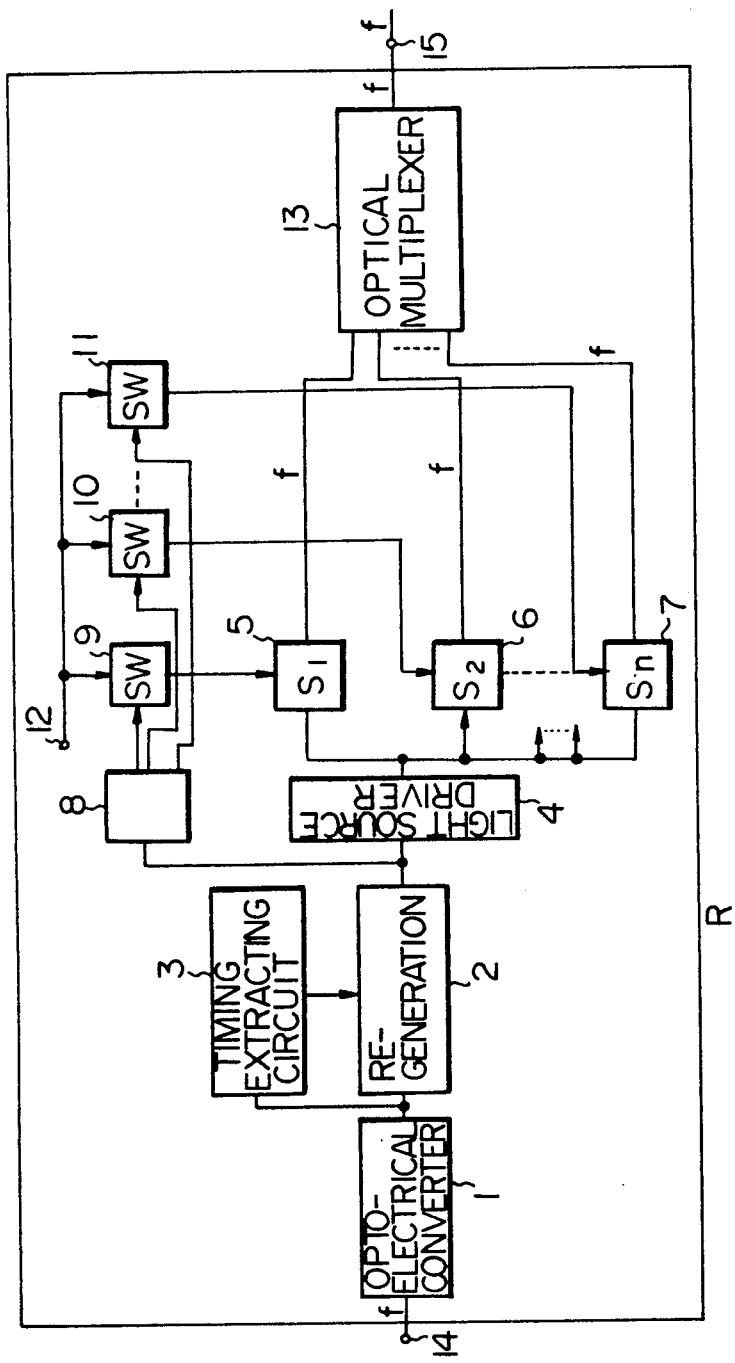
FIG. 4 is a block diagram of an optical repeater according to the present invention.

FIG. 2 shows the light source arrangement in an optical repeater according to the present invention. In the figure, the symbols $S_1$ through $S_4$ are light sources which generate the optical energy of the different wavelengths $\lambda_1$ through $\lambda_4$, respectively. Only one of those light sources are activated by an electrical signal selectively. The symbol f is an optical fiber, 13 is an optical multiplexer which multiplexes wavelengths. In order to operate light sources, a driving circuit, a bias circuit, and APC (automatic power control) circuit are necessary, but those members are not shown for the simplicity of the drawing. The insertion loss of an optical multiplexer 13 is approximate 3 dB in case of four wavelengths shown in FIG. 2, and it should be appreciated that the insertion loss of 3 dB in the circuit of FIG. 2 is smaller than that of FIG. 1, which gives 6 dB of insertion loss in case of four light sources.

The optical multiplexer 13 is conventional, and is implemented, for instance, by a beam focusing type rod lens, a prism, a diffraction grating, a dielectric thinfilm filter, and/or an internal reflection film type focusing rod lens.

FIG. 3 is the example of the optical multiplexer, which is an internal reflection film type focusing rod lens utilizing focusing rod lenses for four wavelengths. In FIG. 3, the symbol $IN_1$, $IN_2$, $IN_3$ and $IN_4$ are optical input terminals for the wavelengths $\lambda_1$, $\lambda_2$, $\lambda_3$ and $\lambda_4$, respectively, and the symbol OUT is the optical output terminal. The arrows in FIG. 3 show the paths of optical beams, FIG. 3 is the example of four wavelengths, and it should be noted more than five wavelengths can be multiplexed using the similar device.

According to the preferred embodiment of the present invention, the wavelengths $\lambda_1$, $\lambda_2$, $\lambda_3$, and $\lambda_4$ are 0.74

μm, 0.82 μm, 0.89 μm and 1.06 μm, respectively. Concerning an internal reflection film type focusing rod lens, the article S3-13 entitled "An internal reflection film type micro-optic circuit" in the general meeting in 1978 organized by the Institute of Electronics and Communication in Japan, disclosed the same.

FIG. 4 is a block diagram of an optical repeater having the redundant arrangement of an optical source according to the present invention. In the optical repeater R, the reference numeral 1 is an opto-electrical converter including an amplifier, and an equalizer, 2 is a regenerator of a digital signal, 3 is a timing signal extracting circuit, 4 is a light source driver, 5, 6 and 7 are optical generators each including an optical source, a bias circuit, and an APC circuit, and it should be noted that each of the light sources generates the different wavelength of optical beam from one another. The reference numeral 8 is a detector of an optical source switching control signal, 9, 10 and 11 are electrical switches, 12 is an electrical terminal for providing a bias current to each light source, 13 is an optical multiplexer, 14 is an optical input terminal of an optical repeater, and 15 is an optical output terminal of an optical repeater.

The operation of the optical repeater of FIG. 4 is as follows. The optical signal applied to the input terminal 14 is converted to an electrical signal by the opto-electrical converter 1, and the output of the converter 1 is applied to the regenerator 2 and the timing signal extracting circuit 3, which regenerate a digital pulse train. The regenerated digital signal is applied to the light source driver 4, which energizes the selected one of the optical generators 5 through 7. If the first optical generator 5 is energized, that generator 5 converts the regenerated digital signal in an electrical form to an optical form, and the optical beam generated by said generator 5 is transmitted into an optical cable through the optical multiplexer 13 and the output terminal 15. It is supposed that the selected optical generator 5 is connected to the terminal 12 through the switch 9 for receiving a bias current to an optical source.

When there is something wrong with the selected optical generator 5, a terminal station on land (not shown) provides an optical source switching control signal to all the repeaters, which is detected by the detector 8 of the designated repeater. Upon detection of that switching control signal, the detector 8 opens the switch 9, and closes one of the switches 10 and 11, thus, the bias current at the terminal 12 is connected to either the optical generator 6 or the optical generator 7. Then, the fault of the optical transmission system caused by an optical source is recovered.

Some modifications of the embodiment of FIG. 4 are possible as described below. The optical source switching control signal can be obtained either at the output of the converter 1 or the timing signal extracting circuit 3, instead of the output of the regenerator 2 of FIG. 4. Further, the fault of a light source of a repeater can be detected automatically in the repeater itself by measuring the operation of the APC circuit, and upon detection of the fault of a light source, the light source can be automatically switched without the operation of a terminal station, although the embodiment of FIG. 4 switches the light source by the control signal from a terminal station on land. Further, electrical switches 9, 10 and 11 can be connected to the output of the light source driver 4, and said light source actuator 4 can be provided for each optical generator. Further, all the optical generators can have the common APC circuit, instead of an individual APC circuit provided for each optical generator.

When a plurality of repeaters R of FIG. 4 are inserted in an optical fiber cable, each repeater will receive different wavelengths depending upon the selected optical source of the upstream repeater. Therefore, the opto-electrical converter 1 of each repeater R must cover the wide wavelengths so that that converter 1 can receive any wavelength of the optical source of the upstream repeater. In this regard, an opto-electrical converter or a photo-cell in the commercial market covers the wide wavelengths enough to cover all the wavelengths available to an optical communication. Then, there is no problem in an opto-electrical converter 1 for the application of the present invention.

Figure 5:
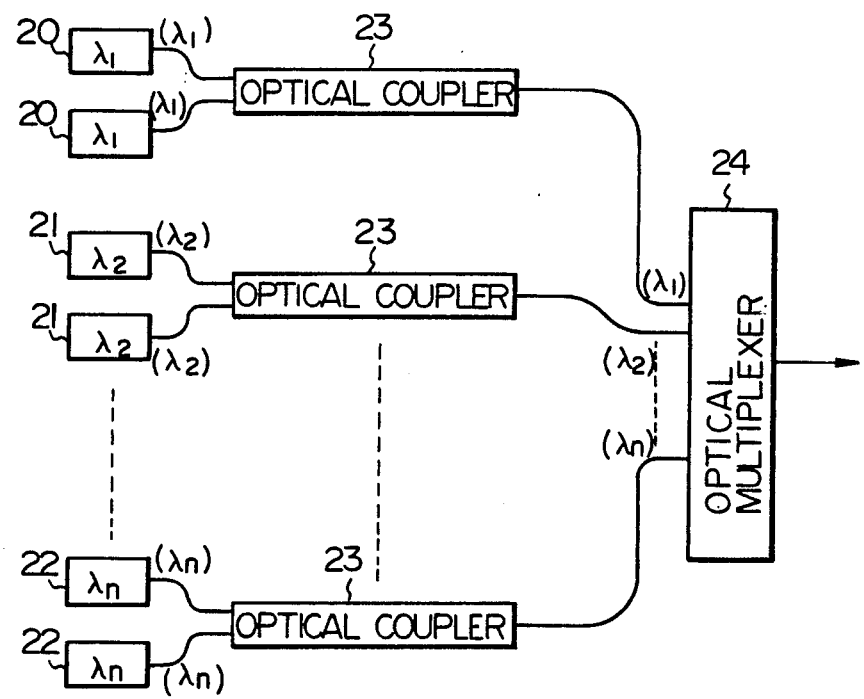
FIG. 5 is the other embodiment of the light source redundant arrangement according to the present invention.

FIG. 5 shows another embodiment of present invention, in which a number of wavelengths available are limited, and the optical sources more than those available wavelengths are desired. In FIG. 5, the reference numerals 20, 21 and 22 are optical generators providing the wavelengths $\lambda_1$, $\lambda_2$ and $\lambda_3$ respectively, 23 is an optical coupler or an optical switch, and 24 is an optical multiplexer. The embodiment of said optical coupler or optical switch is shown in the Japanese patent laid open publication No. 37023/80. It should be noted that when the number of the requested optical generators is n, the required number of wavelengths are merely n/2 as apparent from the drawing. Thus, the nature of an optical coupler and the nature of an optical multiplexer are combined in FIG. 4. Some alternatives of FIG. 5 are possible of course. For instance, an optical coupler 23 can be replaced by an optical switch. And, when the number of input terminals of the optical multiplexer 24 are limited, the wavelengths are preliminary multiplexed by inserting an optical switch before an optical coupler 23, then, the number of wavelengths available are increased.

As explained above, according to the present invention, at least two optical generators having different wavelengths from each other are selectively utilized, and in spite of the low reliability of each individual optical generator, a high operational reliability can be obtained in total by switching the optical generators. The reliable optical generator system is beneficial for increasing the total reliability of an optical repeater and/or an optical communication system.

The application of the present invention is not restricted to an optical repeater, but the present invention can be applicable to other fields, like an optical generator in a terminal station for optical communication, and an optical generator in optical measurement equipment.

From the foregoing it will now be apparent that a new and improved light source arrangement has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A light source arrangement in an optical communication system comprising
   (a) a plurality of pairs of light sources, each light source within each of said pairs having identical wavelengths and each pair of said light sources having a different wavelength from each other pair, (b) a plurality of optical couplers, each of said optical couplers connected to one of said pairs of light sources for coupling together the outputs of each pair of light sources, (c) an optical multiplexer connected between each of said optical couplers and an optical fiber cable for multiplexing the outputs of each of said optical couplers to said optical fiber cable, and (d) an electrical switch for selectively actuating one of said light sources wherein said electrical switch is arranged to select one of said light sources when another of said light sources has failed.

* * * * *